July 7, 1931.  M. P. WETMORE  1,813,105
BOTTLE SEALING METHOD AND APPARATUS
Filed July 5, 1928  7 Sheets-Sheet 1

INVENTOR
MINER P. WETMORE
BY
Adolph A. Thomas
ATTORNEY

July 7, 1931. M. P. WETMORE 1,813,105
BOTTLE SEALING METHOD AND APPARATUS
Filed July 5, 1928 7 Sheets-Sheet 2

INVENTOR
MINER P. WETMORE
BY
Adolph A. Thomas
ATTORNEY

July 7, 1931.  M. P. WETMORE  1,813,105
BOTTLE SEALING METHOD AND APPARATUS
Filed July 5, 1928   7 Sheets-Sheet 3

INVENTOR
MINER P. WETMORE
BY
ATTORNEY

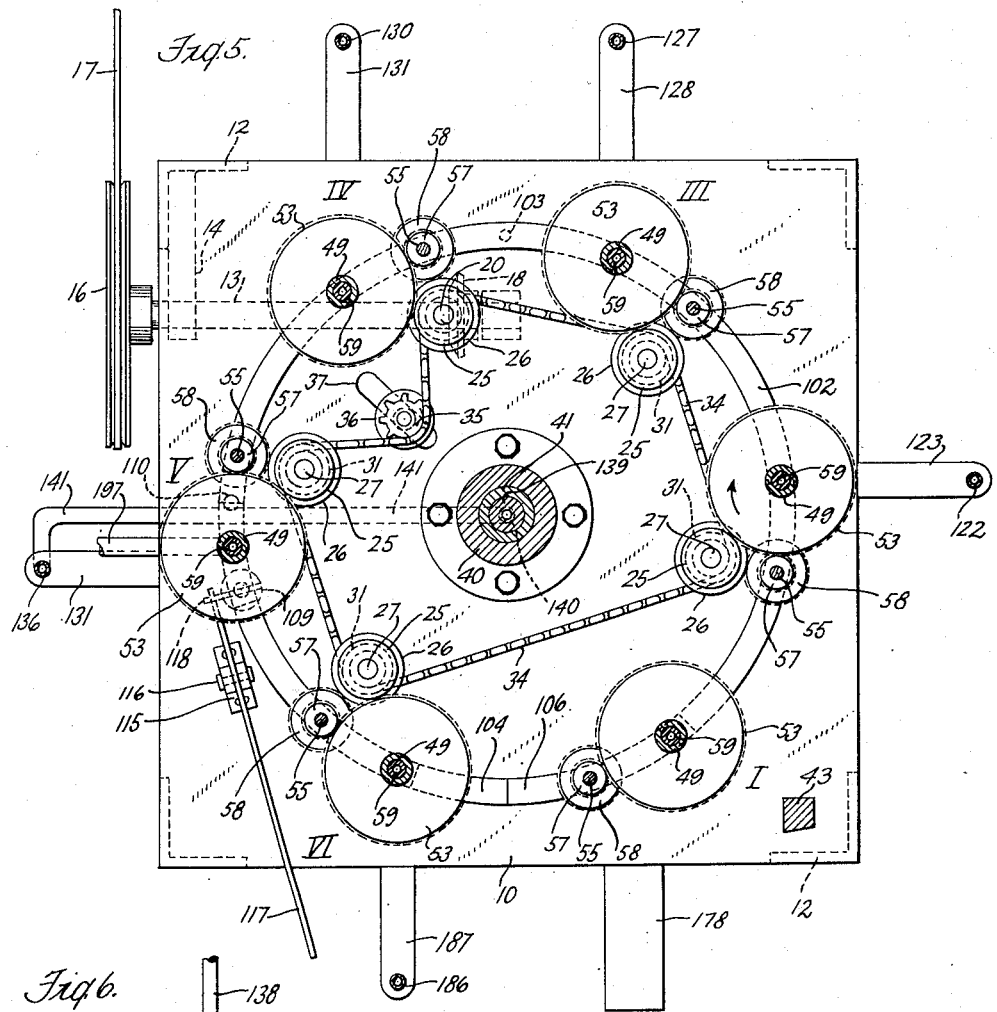
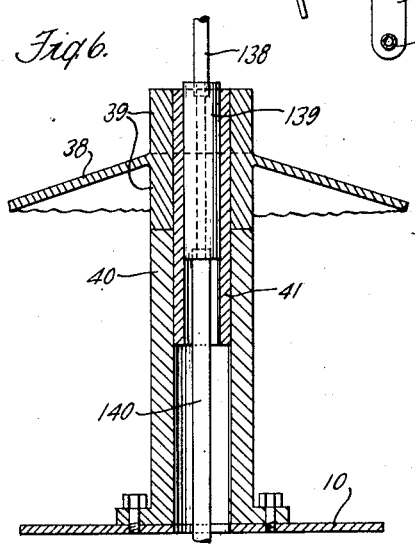

July 7, 1931. M. P. WETMORE 1,813,105
BOTTLE SEALING METHOD AND APPARATUS
Filed July 5, 1928 7 Sheets-Sheet 5
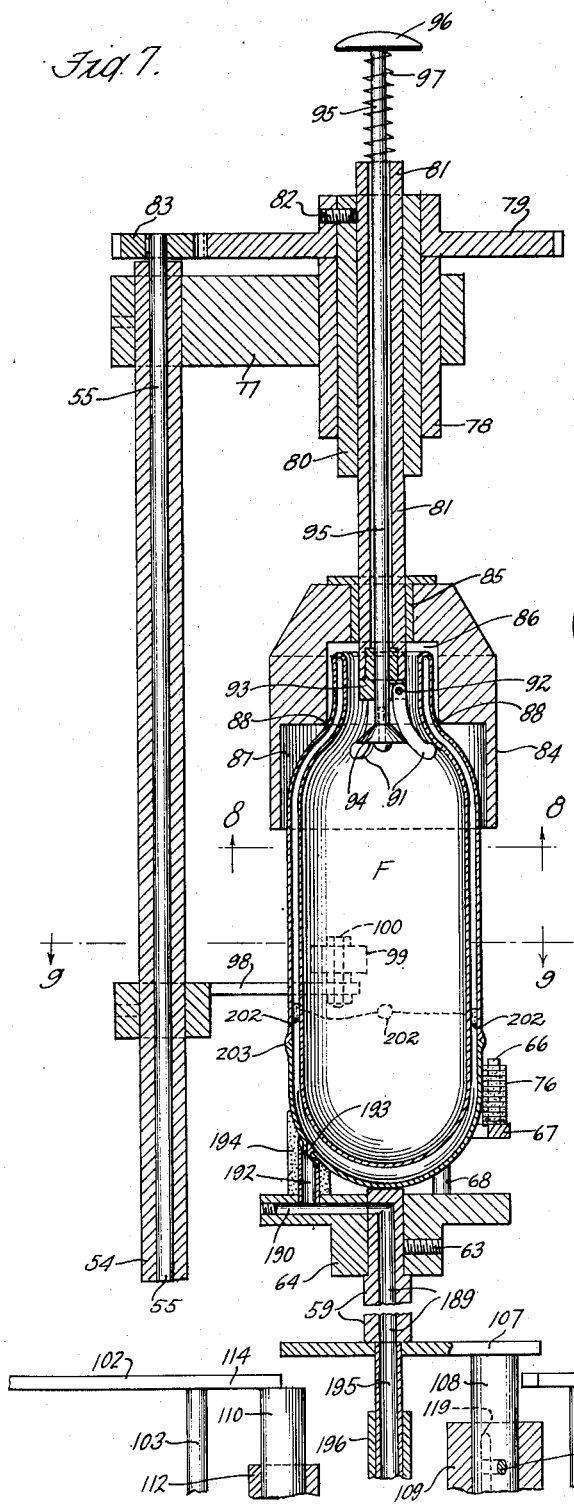
INVENTOR
MINER P. WETMORE
BY
ATTORNEY July 7, 1931.  M. P. WETMORE  1,813,105
BOTTLE SEALING METHOD AND APPARATUS
Filed July 5, 1928    7 Sheets-Sheet 6
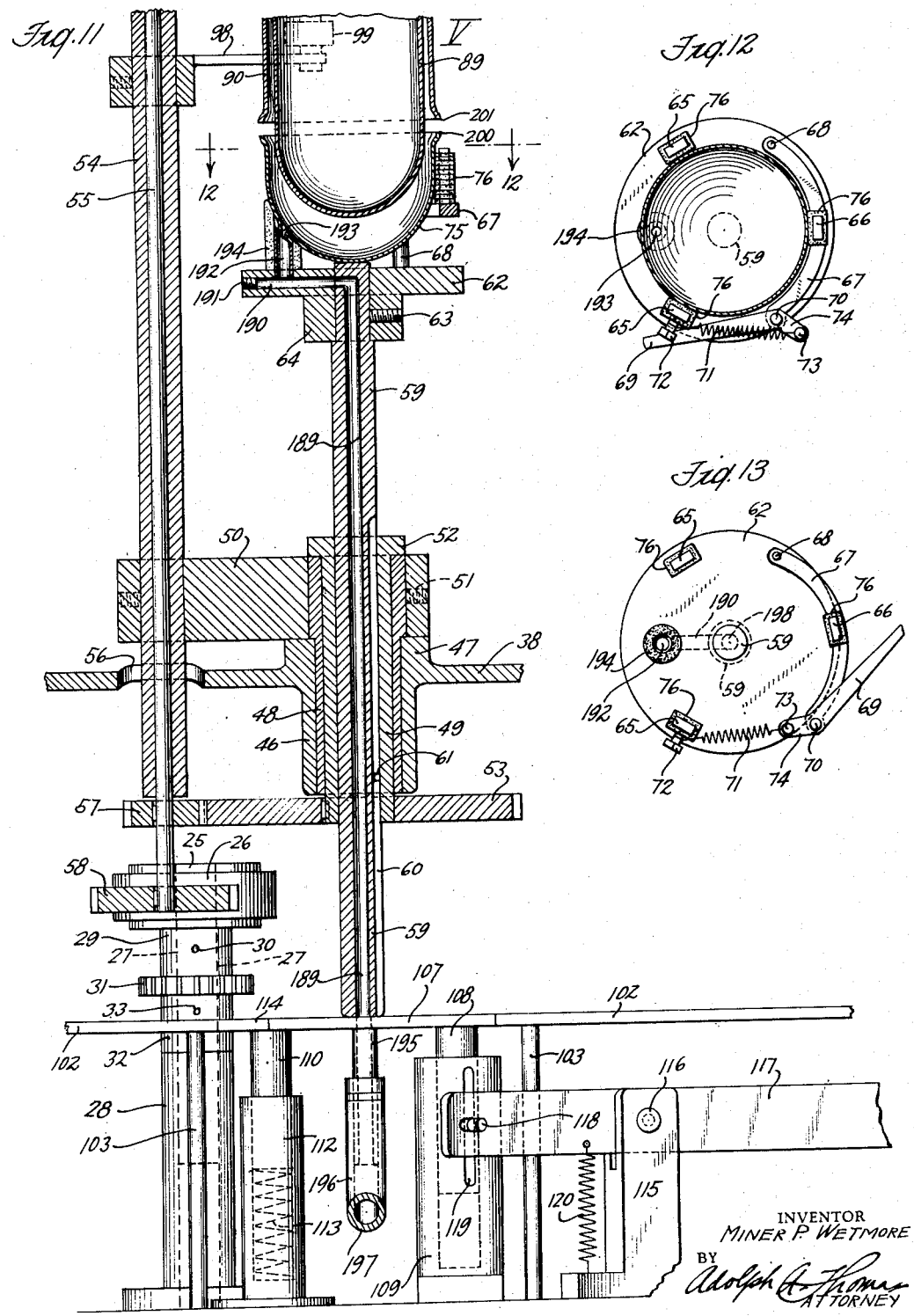
INVENTOR
MINER P. WETMORE
BY
Adolph G. Thomas
ATTORNEY July 7, 1931. M. P. WETMORE 1,813,105
BOTTLE SEALING METHOD AND APPARATUS
Filed July 5, 1928 7 Sheets-Sheet 7

INVENTOR
MINER P. WETMORE
BY
Adolph A. Thomas
ATTORNEY

Patented July 7, 1931

1,813,105

UNITED STATES PATENT OFFICE

MINER P. WETMORE, OF NORWICH, CONNECTICUT, ASSIGNOR TO THE AMERICAN THERMOS BOTTLE COMPANY, OF NORWICH, CONNECTICUT, A CORPORATION OF OHIO

BOTTLE-SEALING METHOD AND APPARATUS

Application filed July 5, 1928. Serial No. 290,468.

This invention relates to the manufacture of double-walled vacuum bottles of glass, and its object is to provide novel methods and means for sealing the outer cylinder at the base after the insertion of the inner cylinder.

It is generally known that double-walled vacuum bottles comprise a pair of nested glass cylinders sealed at the top and separated circumferentially by a narrow space from which the air is exhausted for heat-insulation. A pair of assembled cylinders is usually called a filler, which is mounted in a suitable outer casing to complete the bottle for the market. These cylinders, which shopmen call pistons, are blown in molds as separate pieces with closed rounded bottoms. In bottles with contracted necks, the inner cylinder can not be inserted into the outer cylinder without first removing the bottom of the latter. The practice heretofore followed in assembling the cylinders is substantially this: The outer cylinders are blown about 4½ inches longer than necessary for the completed fillers. The rounded bottom of each outer cylinder is cut off for the insertion of the inner cylinder. The two cylinders are sealed at the top by fusing the rims together in an integral joint. Asbestos pads or the like hold the cylinders in concentric spaced relation. To close the open end of the outer cylinder, which extends for more than two inches beyond the inner cylinder, this extension of surplus glass is worked with a hand tool into a closed spherical bottom.

The foregoing method of assembling the fillers has certain drawbacks from a practical standpoint. In the first place, the outer cylinders must be made over four inches longer than necessary in the finished product. This excess glass means increased cost of labor and material. Secondly, the bottoms cut off the outer cylinders can not be used over and are waste glass. The same is true of the surplus glass that is worked off in shaping the cylindrical extensions into rounded bottoms. This waste manifestly increases the cost of each filler. Then, too, it requires an expert glassman to form the bottoms with a hand tool, and the work is necessarily slow: another item adding to the cost of the finished product. But aside from the question of increased cost, the new bottoms put on the outer cylinders by the old hand method are not entirely satisfactory, for they are liable to be uneven in shape and of varying thickness. If these bottoms are too thin in spots, as sometimes happens, the filler is weak and liable to break. It must be remembered that, after the space between the cylinders is exhausted, the glass walls are subject to considerable strains due to atmospheric pressure. Consequently, it is highly important that the glass walls of the cylinders should have substantially uniform thickness. There is no difficulty in obtaining this uniformity in blown glass, but it is extremely difficult, even for an experienced glass worker, to get so much as approximate uniformity of shape and thickness in the hand-worked bottoms of the outer cylinders.

The above-named objections and disadvantages of the prior sealing method are wholly eliminated by the use of my invention, which provides a cheaper and more efficient way of assembling double-walled fillers and gives a better product. According to my improved process, the outer cylinders are blown in a mold with an outer annular bead near the rounded bottom, and no excess length of cylinder is necessary. That is to say, the cylinders as blown in the mold have substantially the same length as in the completed filler. I do not here take into account the slight extension at the neck where the cylinder is broken off the blow iron. The important thing is that the original blown bottom of the cylinder also constitutes the bottom of the finished product. In assembling the cylinders, the outer cylinder is cut circumferentially along (or near) the central line of the bead to separate the rounded bottom. This leaves the lower end of the open cylinder with an outward flare, and the hemispherical bottom is like a cup with an outwardly flaring rim. These outward flares, which result from the severed bead, provide sufficient extra glass to seal the parts together after the inner cylinder has been united at the neck to the outer cylinder. I have devised suitable apparatus for supporting the cylinders and cups or rounded bottoms, which are moved into sealing contact with the flared rims of the open cylinders. The glass is heated to the right temperature by gas burners and the severed parts are reunited by a sealed joint formed automatically without shaping tool. This will be described in detail later on. The practical advantages of my invention include a saving of glass (and therefore increased production at the glass factory), decreased manufacturing cost of fillers, and a better and stronger product due to the uniform thickness and correct shape of the blown bottoms.

To explain my invention so that those skilled in the art may fully understand the same and put it to practical use, I shall describe a machine which I have constructed and successfully operated to carry out the principles of my invention. This machine is illustrated in the accompanying drawings, in which Fig. 1 shows a front view of the machine;

Fig. 5 represents a section on line 5—5 of Fig. 1;

Fig. 6 is a fragmentary view in cross-section on line 6—6 of Fig. 3;

Fig. 7 is an enlarged fragmentary view in vertical section, showing how a filler is supported in sealing position on the machine, this view showing the bottom sealed to the outer cylinder;

Fig. 8 is a section on line 8—8 of Fig. 7;

Fig. 9 is a section on line 9—9 of Fig. 7;

Fig. 10 shows a cross-section (partly broken away) of the outer cylinder as blown in the mold with a circumferential outer bead near the rounded bottom;

Fig. 11 is a detail view, partly in cross-section, showing the cylinders in position before the severed bottom is raised into sealing contact with the body of the outer cylinder;

Fig. 12 is a section on line 12—12 of Fig. 11, showing how the cup-shaped bottom cut from the outer cylinder is rigidly clamped on its supporting disk;

Fig. 13 is a view similar to Fig. 12, with the clamping means in releasing position;

Figure 14:
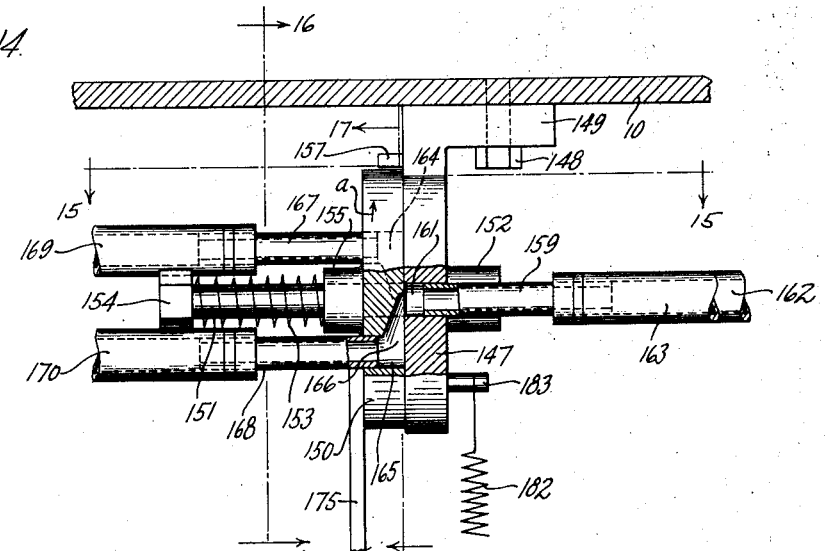
Figure 15:
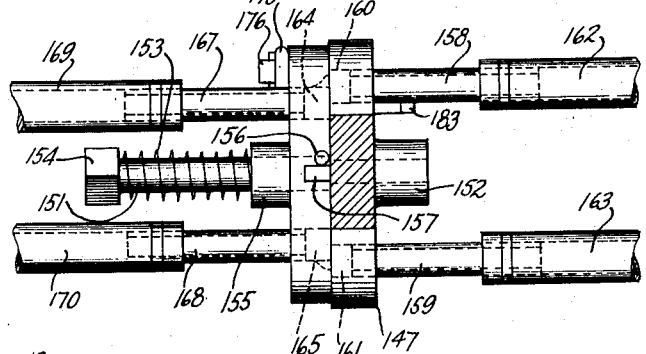
Figure 16:
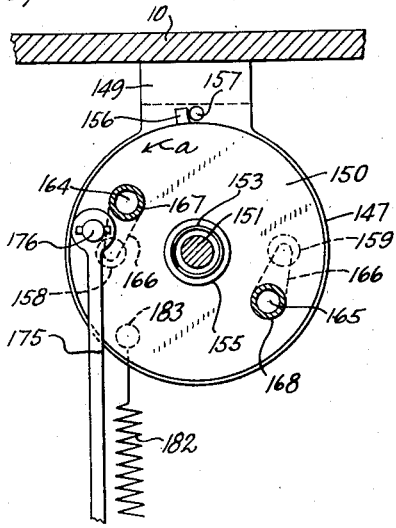
Figure 17:
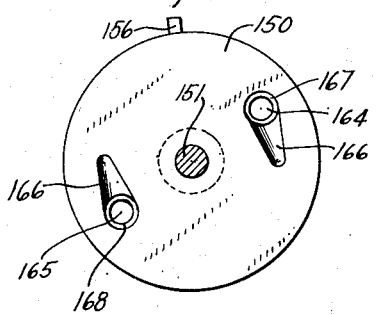

Fig. 14 is a detail view, partly in section, to show certain valve connections for controlling the supply of air and gas to the burners during the sealing operation; and Figs. 15, 16 and 17 are sectional views on lines 15—15, 16—16 and 17—17, respectively, of Fig. 14.

The various mechanisms comprising the machine are supported on a suitable frame which is here shown as a base plate 10 mounted on legs 12. A driving shaft 13 is journalled at its ends in a pair of brackets 14 and 15. The horizontal bracket 14 is secured to one of the legs 12, and the vertical bracket 15 is fastened to the underside of plate 10. The outer end of shaft 13 carries a pulley or other driving member 16, which is connected by a belt or chain 17 to a suitable source of power, such as an electric motor (not shown). At the inner end of shaft 13 is a bevelled gear 18 arranged to mesh with a bevelled pinion 19 fixed on the lower end of a vertical shaft 20, which is rotatably mounted in a fixed sleeve 21. This sleeve extends through a hole in base plate 10 and is provided with a collar 22 secured to the underside of plate 10 by bolts 23, which also pass through a collar 24 on the top plate 10. The upper end of shaft 20 carries a wheel 25, which has a rubber driving ring 26 fixed thereon. As seen in Fig. 5, there are four additional driving wheels 25 mounted on vertical shafts 27. All the wheels 25 are provided with rubber rings 26. The vertical shafts 27 are rotatably mounted in fixed sleeves 28 rigidly supported on base plate 10.

Referring to Fig. 11, each rubber-tired wheel 25 has a hub 29 secured to the shaft 27 (or 20) by a pin 30, or otherwise. Below the hub 29 is a sprocket wheel 31 having a hub 32, which is attached to the associated shaft 20 or 27 in any suitable way, as by a pin 33. The parts 25, 29, 31 and 32 can be made as a single casting. The sprocket wheels 31 are connected by a driving chain 34, which is held taut by an idler sprocket 35 (see Fig. 5) mounted on a sleeve 36. To permit regulation of the tension of sprocket chain 34, the sleeve 36 is radially adjustable by means of a slot 37 on base plate 10. Any suitable means may be used for securing the sleeve 36 in adjusted position. It is clear from the preceding description that the five wheels 25 are simultaneously rotated at the same speed by the vertical shaft 20, which is driven from the continuously rotating shaft 13.

Above the base plate 10 is mounted a rotary table 38, which may be an aluminum casting of conical shape. As shown in Fig. 6, the table 38 is provided with a central hub or sleeve 39 adapted to rest on a tubular bearing 40 secured to the base plate. A sleeve 41 fixed in hub 39 extends into the tubular bearing 40 and constitutes a rotary connection between the table 38 and bearing 40. Any other practical mounting may be used for the rotary table 38. In the present machine, I have not shown any mechanical driving connections for table 38, which is rotated by hand when required. The table is rigidly held in adjusted position by a spring detent 42 secured at one end to a post 43 on base plate 10. The free end of detent 42 carries a slotted head 44 adapted to engage a series of stops 45 projecting radially from the edge of table 38. There are six stops 45, because the machine has a capacity of six fillers, but this number may be varied to suit the requirements of any particular machine. The stops 45 may be cast integral with table 38, or they may consist of bolts separately attached to the rim of the table. To release the table for rotary movement, the operator pulls back the detent 42 until the slotted head 44 disconnects the stop 45. When the next stop is reached after turning the table the proper moment, the detent is allowed to snap into locking engagement with the stop. The cooperation of detent 42 and stops 45 not only locks the table against rotation, but insures the correct position of the table and the bottle supports carried thereby for each sealing operation. This will be better understood when I describe the mechanism for supporting the bottles on the rotary table.

Referring to Fig. 11, the table 38 is provided with a series of vertical hubs 46, which terminate in horizontal bearing extensions 47 above the table. There are six of these hubs, because, as previously mentioned, the present machine is supposed to have a capacity of six bottles. In each hub 46 is fixed a tubular bearing 48 in which is mounted a rotary sleeve 49. An arm 50 is secured to the upper end of bearing 48, as by a pin 51 or otherwise. The rotary sleeve 49 has an annular flange 52 at the top adapted to rest on bearing 48. A large gear 53 is secured to the lower end of each rotary sleeve 49. Each arm 50 carries a vertical sleeve 54 in which is mounted a rotary shaft 55. The sleeves 54 extend through holes 56 a sufficient distance below the top of table 38. Each shaft 55 carries at its lower end a small gear or pinion 57 and a larger gear 58. The pinions 57 are permanently in mesh with the large gears 53, and the gears 58 are adapted to engage the driving wheels 25 when the table 38 is in rest position. The teeth of gears 58 bite into the rubber rings 26 of wheels 25, whereby the rotation of the latter is communicated to the gears. At the same time, this elastic frictional connection permits movement of the gears 58 out of engagement with the wheels 25 when the table 38 is rotated. When the table reaches its next position, the gears 58 automatically come into driving contact with the continuously rotating wheels 25. As previously explained, the wheels 25 are mounted independently of the table 38 and do not therefore move bodily therewith. The gears 53 always remain in mesh with the pinions 57, because both wheels are carried by the rotary table 38 and therefore move as a unit when the table 38 is intermittently rotated from one position to the next. It will be clear from what has been said, that the wheels 25 simultaneously rotate the sleeves 49 and the shafts 55 during the stationary intervals of the table 38. It is evident that the sleeves 49 rotate considerably slower than the shafts 55 on account of the reducing connections between the gear members 57 and 53.

A hollow shaft 59 is mounted in each sleeve 49, as best shown in Fig. 11. The shaft 59 is so connected to the sleeve as to rotate therewith, and yet be capable of independent vertical movement. For this purpose, each shaft 59 has an axial groove or slot 60 in which operates a pin 61 carried by the sleeve 49. On the upper end of shaft 59 is fixed a disk 62 in any practical way, as by means of a set-screw 63 passing through the hub 64 of the disk, which carries a pair of fixed posts 65. A third post 66 is carried by a curved arm 67 pivoted to a pin 68 on disk 62. A lever 69 is pivoted to the free end of arm 67 by a pin 70. A coil spring 71 is connected at one end to a projection 72 on one of the posts 65, and the other end of this spring is connected at 73 to the extension 74 of lever 69.

Referring to Fig. 12, it will be seen that when the lever 69 is in normal position against the adjacent stop 65 to which the spring 71 is connected, the tension of the spring pulls the curved arm 67 inwardly, so that a cup-shaped member 75 is firmly supported on disk 62 between the three posts 65 and 66. As I shall later more fully explain, the cup-shaped member 75 is the rounded bottom cut from the outer glass cylinder of the filler. Since the glass cup 75, as I shall briefly call it, is subjected to high heat during the sealing operation, the posts 65 and 66 are preferably wound with asbestos wrapping 76, or other heat-insulating material, so that the glass will not adhere to the hot metal parts. The three posts 65 and 66 are preferably arranged equidistantly, so as to exert radial pressure against the cylindrical wall of cup 75. To release the cup from its supporting disk 62, it is only necessary to swing back the lever 69, as shown in Fig. 13, whereby the post 66 is moved away from the cup. The hollow shaft 59 may project slightly above the disk 62 (see Figs. 7 and 11) to form a contact point for the rounded bottom of cup 75. These cups 75 rotate with their supporting disks 62, which are simultaneously rotated by the wheels 25 during the stationary intervals of table 38.

The vertical sleeves 54 carry each at the upper end an arm 77 in which is fixed a bearing 78. A gear 79 is mounted at the upper end of a sleeve 80 journaled in bearing 78, as best shown in Fig. 7. A hollow shaft 81 passes through sleeve 80 and rotates therewith. A set-screw 82 not only connects the gear wheel 79 to the sleeve 80, but also secures the hollow shaft 81 in vertically adjusted position. The advantage of making the shaft 81 adjustable axially in sleeve 80, is to accommodate fillers of different sizes, as will presently be understood. The gear 79, which may be cast integral with sleeve 80, is permanently in mesh with a pinion 83 fixed on the upper end of shaft 55. The gear connections 57—53 and 83—79 are identical, so that the hollow shafts 59 and 81 always rotate in unison. The shaft 81 carries a head 84, which may be an aluminum casting for lightness and strength. The head 84 is rigidly attached to shaft 81 in any practical way, as by means of a tight-fitting sleeve or bushing 85 (Fig. 7). The interior of head 84 comprises a small upper chamber 86 and a large lower chamber 87, these chambers forming an annular shoulder 88. The chambers 86 and 87 are adapted to receive the upper end of a double-walled glass filler or bottle F, which comprises an inner cylinder 89 and an outer cylinder 90. The bottle F is releasably held in head 84 by three pendent arms 91 pivoted at 92 to a plug 93 fixed in the lower end of hollow shaft 81. The arms 91 normally hang loose and are held outwardly against the inner cylinder 89 by a beveled head 94 attached to the bottom of a rod 95, which is vertically movable in the hollow shaft 81. The upper end of rod 95 is provided with a hand grip 96 for pushing the rod down. A coil spring 97 normally holds the rod 95 raised, so that the cone head 94 pushes against the arms 91, which are thereby held in supporting contact with the bottle.

When the operator wants to remove a bottle from head 84, he simply depresses rod 95 whereby the cone 94 is moved down sufficiently to allow the arms 91 to hang loose and permit removal of the bottle. To insert a bottle into head 84, the rod 95 is held down until the upper end of the bottle has been pushed into the head against the annular shoulder 88. As soon as the rod 95 is released, it is raised by the spring 97 and the cone head 94 pushes the pivoted fingers 91 radially outward into supporting engagement of the bottle, which is pressed against the annular shoulder 88. The sleeve 54 carries a V-shaped arm 98 provided at its ends with a pair of rollers 99 arranged to make contact with the supported bottle and automatically hold the same in centralized position. If, for instance, the bottle or filler F should be slightly off center after the operator has inserted it into head 84, the bottle will receive a wabbling motion during rotation of head 84. As soon as the wabbling bottle strikes the rollers 89, the latter force it into axial alignment with the rotating shafts 59 and 81. To permit slight radial adjustment of rollers 99, in order to obtain the correct central position for bottles of predetermined outer diameter, the pivot pins 100 of the rollers pass through radial slots 101 in the ends of arm 98.

Figure 1:
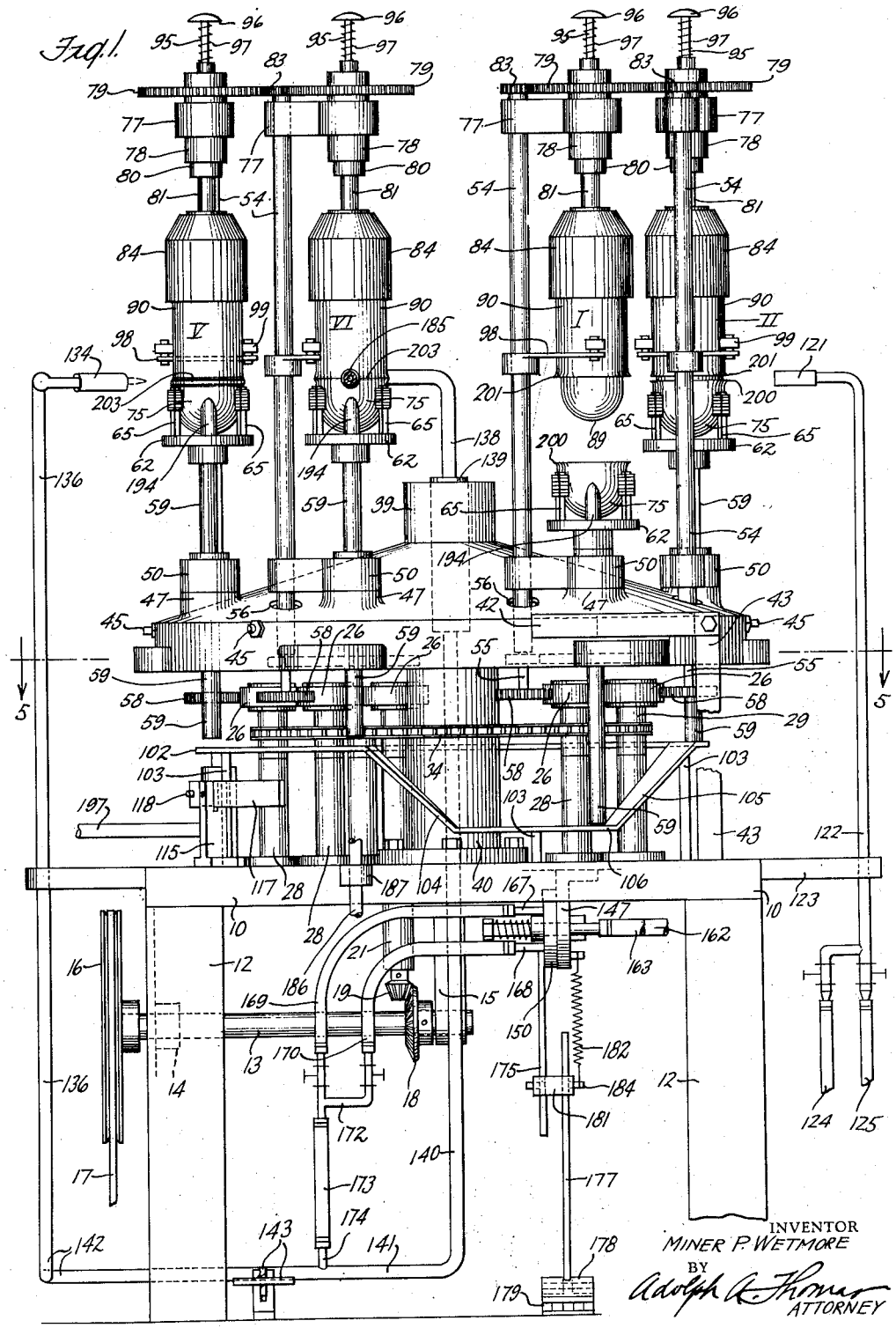

On base plate 10 is mounted a cam track indicated as a whole by 102. A series of posts 103 support the cam track a prescribed distance below the rotary table 38. As seen in Fig. 5, the cam track 102 is circular in plan, and its circumference includes the shafts 55 and 59. The greater portion of cam track 102 is horizontal, but a part of it consists of two reversely inclined sections 104 and 105, which are connected at their lower ends by a horizontal section 106, as clearly shown in Fig. 1. The vertically slidable shafts 59 ride over cam track 102. When a bottle is in initial or loading position I (see Figs. 1 and 5), the associated shaft 59 is in lowermost position due to the depressed cam section 106. This makes it easy for the operator to insert a bottle in head 84 and place a cup 75 on the supporting disk 62. When the table 38 is rotated counterclockwise to move the bottle and cup from position I to position II, the shaft 59 rides over the rising cam section 105 onto the main elevated section of the cam track. Referring to Fig. 1, it will be seen that, when the shaft 59 is on the highest part of the circular track 102, the upper edge of cup 75 is slightly below the lower edge of the outer cylinder of the bottle. The two parts of the bottle remain in this relation while moved to positions III, IV and V.

Figure 2:
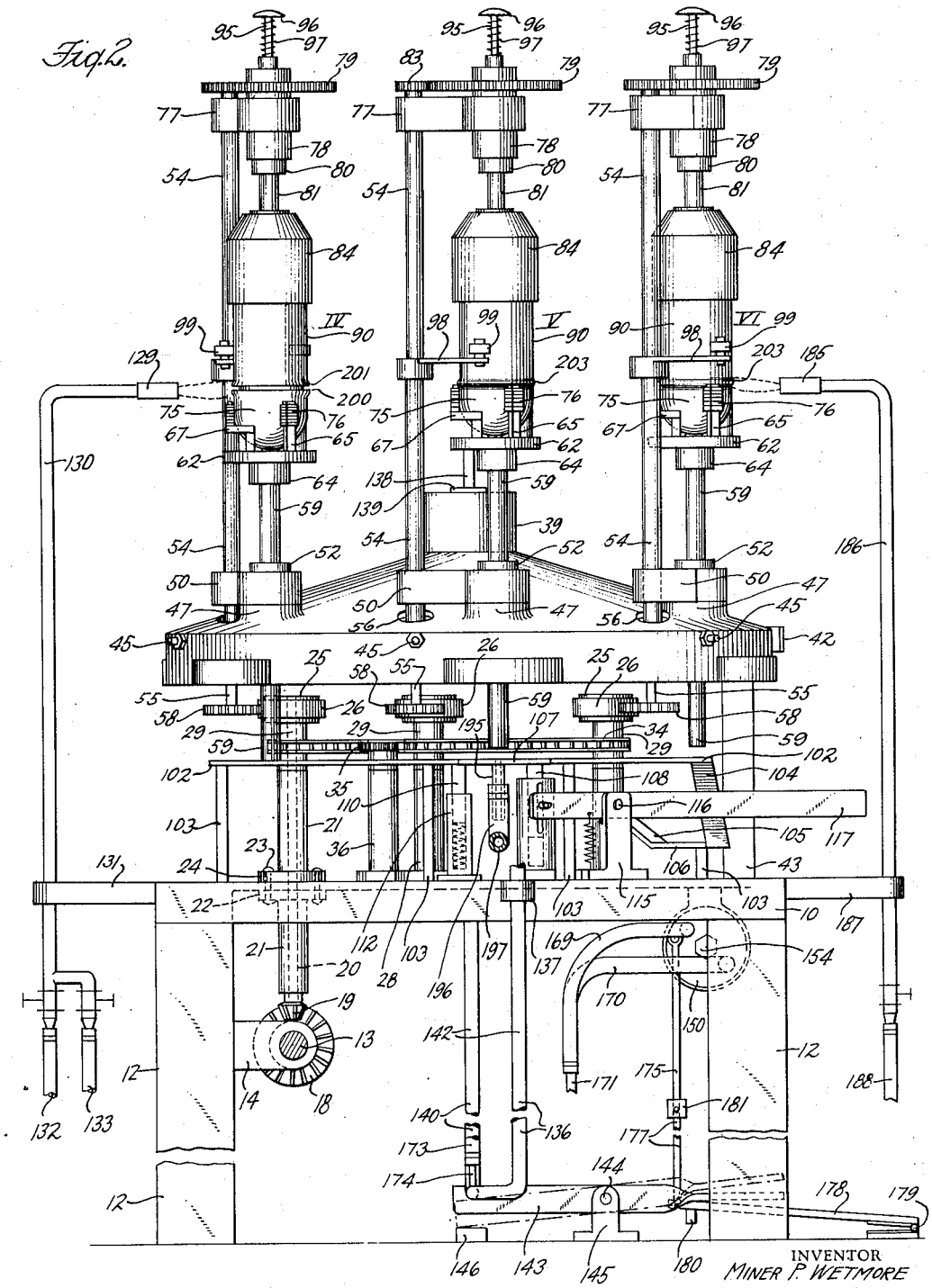
Fig. 2 is a side view looking at the left end of the machine.

In position V, which is the sealing position, the shaft 59 is in line with a movable section 107 of cam track 102, as shown in Figs. 2 and 11. The track piece 107 is carried by a vertically movable plunger 108, which operates in a cylindrical casing 109. A second plunger 110 is mounted to move vertically in a fixed sleeve or casing 112, which contains a coil spring 113 adapted to hold the plunger 110 against the fixed end 114 of cam track 102. As best shown in Fig. 11, one end of the movable track section 107 rests on the spring-pressed plunger 110, whereby the section 107 is normally held flush with the main stationary track 102. On base plate 10 is fixed a slotted bracket 115 carrying a pin 116 for pivotally supporting a lever 117, which in this instance is operated by hand. The rear end of lever 117 is connected by pin 118 to plunger 108. A slot 119 in housing 109 accommodates the pin 118 for vertical movement. This pin is carried by the plunger 108 and extends through a slot in lever 117. When the front end of lever 117 is depressed, the plunger 108 is raised and carries with it the track section 107, which lifts the supported shaft 59 (see Fig. 7). In this way, the operator is able to move the upper edge of cup 75 into sealing contact with the lower edge of the outer cylinder 90, as will presently be more fully explained when I take up the general operation of the machine. The lever 117 and all connected parts are held in normal lowermost position by a tensioned coil spring 120, which is connected at one end to bracket 115 and at the other end to lever 117. The downwardly pulling spring 120 is not sufficient to overcome the upwardly pushing spring 113 of plunger 110, so that the spring 120 cannot pull the movable track section 107 out of normal alignment with the stationary portion of cam track 102.

As the bottles F and cups 75 are moved by the rotary table 38 from initial position I to final position VI, the edges to be sealed are heated by gas burners to the desired temperature, this heat gradually increasing from one position to the next. I shall now describe the the gas and air connections for the burners. The first heat is applied to the bottle in position II by means of a single burner 121 carried at the upper end of a pipe 122, which is rigidly mounted on an arm or bracket 123 secured to base plate 10, as shown in Figs. 1 and 5. The fuel pipe 122 is connected at its lower end to valve-controlled gas and air pipes 124 and 125. The flame from burner 121 is directed against the separated edges of outer cylinder 90 and cup 75, while those parts are rotated at uniform speed through the connections previously described. In position III, the heating of the sealing edges is continued by a burner 126 at the upper end of a pipe 127, which is supported by an arm or bracket 128 projecting rearwardly from base plate 10. The lower end of pipe 127 is connected with a gas and air supply similar to the pipe 122. In position IV, the rotating bottle is heated by a gas burner 129 attached to the upper end of a pipe 130, which is supported by an arm or bracket 131 extending from the rear of base plate 10. The burner pipe 130, like the pipes 122 and 127, is connected at its lower end to a source of air and gas supply by means of rubber tubes 132 and 133 (see Fig. 2).

Figure 3:
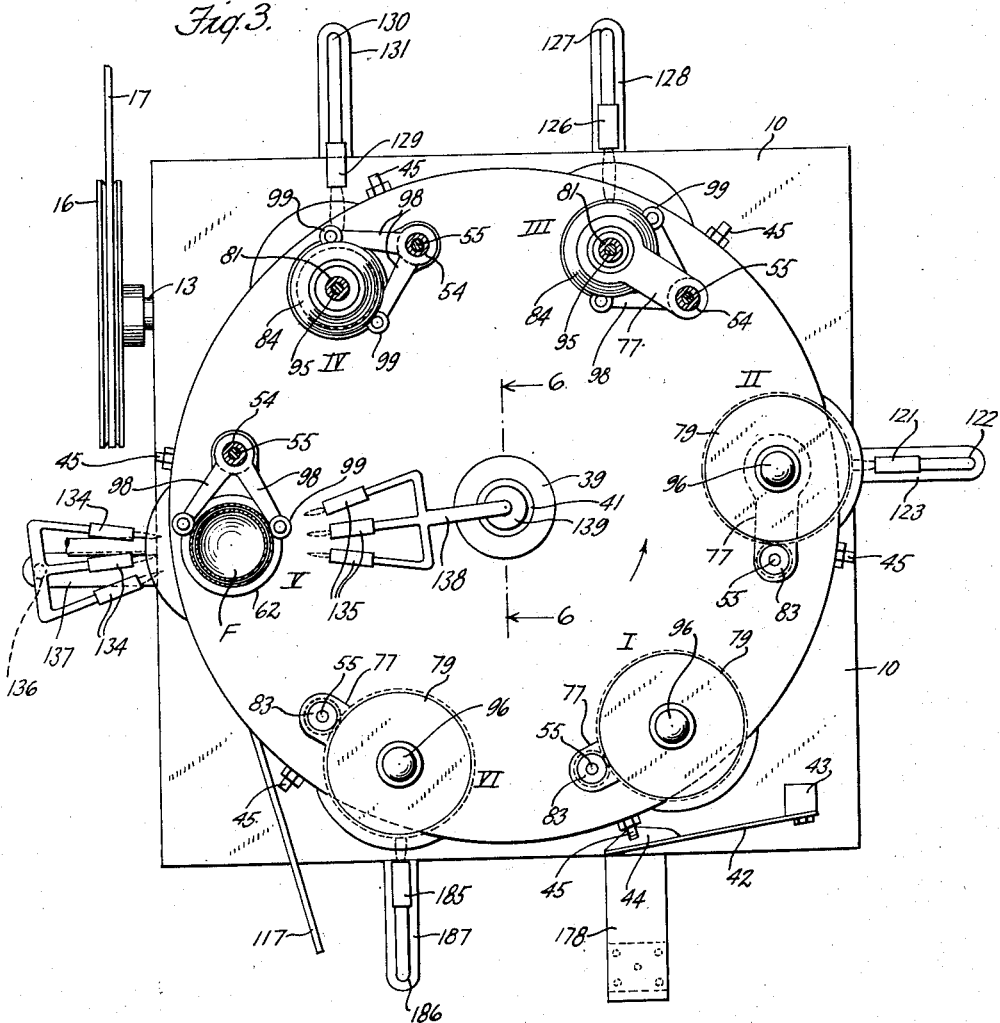
Fig. 3 shows the machine in top plan, with certain parts cut off for clearness.
Figure 4:
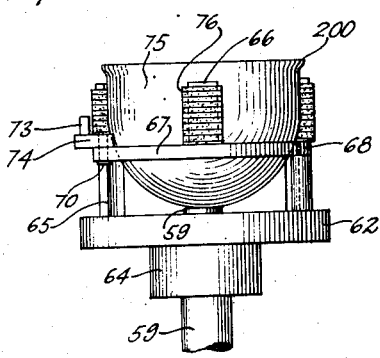
Fig. 4 is a detail to show how the severed bottom of the outer cylinder is supported for movement into sealing contact with the body of the cylinder.

When a bottle reaches sealing position V, the heat is raised sufficiently to render the glass plastic for sealing. This high heat is produced by two sets of three burners 134 and 135 arranged diametrically opposite in converging relation to concentrate the flames against the sealing edges of the rotating bottle. This arrangement of the burners is clearly shown in Fig. 3. The burners 134 are mounted on the upper end of a pipe 136, which is slidably supported by an arm or bracket 137 projecting from the left edge of bed plate 10. The burners 135 are carried by a right-angled pipe 138, which is connected at its lower end to a tube 139 slidably mounted in the sleeve 41 of the central hub 40, as clearly shown in Fig. 6. A pipe 140 is connected at its upper end to the bottom of tube 139. A horizontal pipe 141 connects the lower ends of pipes 136 and 140. The pipes 136, 140 and 141 may be formed from a single piece of piping and constitute a U-shaped frame vertically slidable in bracket 136 and sleeve 41. For convenience I shall refer to this U-shaped burner frame as a whole by the reference numeral 142. This frame is raised and lowered by means of a pedal 143 pivoted at 144 on a bracket 145. The rear end of pedal 143 has a groove or notch for receiving the horizontal pipe 141. The weight of frame 142 holds the rear end of pedal 143 down on block 146. In other words, the sealing burners 134 and 135 are normally in the lowermost position and are moved up and down at will by means of the pedal 143.

The U-shaped burner frame 142 is supplied with a controllable air and gas mixture through the following connections. As shown in Figs. 1 and 14-17, there is a disk 147 secured to the underside of base plate 10 by one or more bolts 148 passing through a horizontal extension 149, which may be cast integral with the disk. A second disk 150 is rotatably mounted adjacent the fixed disk 147 on a shaft 151. The fixed disk 147 is provided with a hollow boss or hub 152 in which one end of shaft 151 is screwed for rigid support. The rotary disk 150 is constantly held in airtight contact with disk 147 by a tensioned coil spring 153 on shaft 151. This spring is arranged between the head 154 of shaft 151 and the hub 155 of disk 150. The rotary disk 150 may have a stop 156 normally engaging a stop 157 on the stationary disk 147. A pair of pipes 158 and 159 are inserted in openings 160 and 161 of disk 147, this connection being air and gas tight. The pipes 158 and 159 lead through rubber tubes or other connections 162 and 163 to a source of air and gas supply. That is to say, the tube 162 is left open to the atmosphere (or a source of air pressure) and tube 163 is connected to a tank or reservoir of fuel gas (not shown). The rotary disk 150 has a pair of openings 164 and 165 arranged diametrically opposite and terminating in beveled recesses 166, which communicate with the openings 160 and 161 of disk 147. The openings 164 and 165 of disk 150 receive the ends of pipes 167 and 168 in an airtight fit. Rubber hose 169 and 170, or other tubular connections, lead from pipes 167 and 168 to valve-controlled pipes 171 and 172 (see Fig. 1), which in turn connect with a rubber tube 173 attached to a nipple 174 of pipe 141.

It is clear from the preceding description that the U-shaped burner frame 142, which carries the two sets of burners 134 and 138, is connected to the air and gas supply pipes 162 and 163 through valve mechanism represented by disks 147 and 150. The operator is able to control the flow of air and gas by rotating the disk 150. This may be accomplished by any suitable connections. In the present machine there is a link 175 connected at its upper end to a pin 176 on disk 150. A second link 177 is pivoted at its lower end to the rear end of a pedal 178, which is hinged at 179 to a fixed support. A block or projection 180 at the rear end of pedal 178 limits the downward movement of the latter. The links 175 and 177 are connected by an adjustable cross-piece 181. A contracting coil spring 182 is connected at its upper end to a pin 183 on disk 147, and the lower end of the spring is connected to a pin 184 on cross-piece 181. The parts 175, 177 and 181 can be shaped from a single bar, but the adjustable cross-piece 181 has the advantage that it permits regulation of the normal tension of spring 182. The constant upward pull exerted by this spring on links 175 and 177 holds the stop 156 of disk 150 against the stop 157 on the stationary disk 147. When the valve disk 150 is in normal position, the supply of air and gas to the burner frame 142 is a minimum, because only the tips of the bevelled recesses 166 are in communication with the feed openings 160 and 161 in disk 147, as will be clear from the cross-sectioned portion of Fig. 14. To increase the supply of fuel, the operator presses down on pedal 178 to rotate the disk in the direction of arrow a in Figs. 14 and 16. This movement of disk 150 moves the bevelled recesses 166 toward the openings 160 and 161, thereby uncovering a greater area of those openings. When the pedal 178 is fully depressed, the supply pipes 158 and 159 are fully open to pipes 167 and 168 of valve disk 150, so that the maximum amount of fuel is fed to the sealing burners 134 and 135.

In position VI, the sealed joint of the bottle is subjected to the annealing heat of a burner 185 on the upper end of a gas pipe 186, which is supported in a bracket 187 projecting from the front edge of base plate 10, as best shown in Fig. 2. The lower end of pipe 186 may be provided with a valve and is connected to a rubber tube 187, which is supposed to lead to a source of gas supply. From annealing position VI, the sealed bottle is carried by table 38 to initial position I, where it is removed by the operator, who then inserts a new filler and cup. Position I may therefore be called the unloading and loading position.

It is advisable during the sealing operation to subject the annular space 188 of the filler (see Fig. 7) to air pressure sufficient to prevent collapse of the plastic seal under the action of the hot flames. Accordingly, when the bottle reaches sealing position, the annular chamber 188 is automatically connected with a source of air pressure. Each shaft 59 has an air passage 189 which is open at the bottom and communicates at the top with a radial bore 190 in the cup-supporting disk 62. The outer end of bore or passage 190 is closed by a screw-threaded plug 191 or otherwise. On disk 162 is fixed a tube 192, which is open to the bore or passage 190. The cups 75 are each formed with a tubular extension 193 through which the annular chamber 188 of the bottle is subsequently exhausted. When the cup 75 is placed on disk 62, the tubular extension 193 fits into the tube 192. To make this connection airtight, the tube 192 is provided with a rubber nipple 194 shaped to fit tight against the rounded surface of the cup. This will be clear from Figs. 7 and 11. When a bottle is in position V, the air passage 189 of shaft 59 is in line with a pipe 195 carried by the movable cam section 107. The pipe 195 slides in a vertical sleeve 196, which is connected to (or forms part of) a horizontal pipe 197 connected to a suitable source of air pressure, such as an air pump (not shown). As each shaft 59 connects with pipe 195 in position V of the bottle, the annular chamber 188 is subjected to the proper amount of air pressure to counteract the pressure of the annealing flames. This counterbalancing of the inner and outer pressures prevents collapse of the seal.

When the outer cylinders 90 are blown in the glass factory, they are molded with an outer annular bead 198, as shown in Fig. 10, where the upper part of the cylinder is broken away for lack of space. To permit insertion of an inner cylinder 89 in an outer cylinder 90, the latter is cut off at the bead, as diagrammatically indicated by the dotted line 199 in Fig. 10. This cutting can be done by means of a diamond point held against the bead while the cylinder is rotatably supported, as will be understood without the need of additional illustration. The cut-off bottom portion of the outer cylinder is now the cup 75, previously referred to, and the upper end of this cup terminates in an outwardly flaring edge 200, which was originally the lower half of bead 198. The main body of the outer cylinder 90 terminates in a flaring edge 201, which was originally the upper half of bead 198. After the inner cylinder has been inserted in the outer cylinder, the two parts are sealed at the neck. This neck-sealing operation has nothing to do with my present invention, and need not therefore be described in detail. It is customary to insert spacing pads 202 of asbestos between the cylinders to hold them firmly in concentric relation and to cushion the inner cylinder against lateral shocks.

In the bottle supporting-mechanism occupying position I on the rotary table 38, the operator inserts a bottle unit in head 84 and then places a cup 75 on disk 62. By a bottle unit I mean a pair of inner and outer cylinders sealed at the neck, with the outer cylinder open at the bottom to be reunited to cup 75. It is not necessary that the identical cup originally cut from the outer cylinder shall be put back on, because any cup will fit any cylinder, since they were all blown in the same mold. The bottle unit and cup are carried by table 38 to position II, where the first heat is applied. It should be remembered that, during the stationary intervals of table 38, the bottle units and cups are continuously rotating to receive uniform heating around the edges to be sealed. From position II the bottle parts are carried to positions III and IV, where the heat is increased until annealing heat is reached in position V. In the first four positions the flaring edges 200 and 201 remain slightly separated, and that separation continues when the parts first reach position V. When the operator sees that the rims or edges 200 and 201 are sufficiently plastic (which happens in a few seconds), he presses down on the front end of lever 117 to raise the shaft 59 and thereby bring the flared edge 200 of cup 75 into contact with the correspondingly flared edge 201 of the outer cylinder. At the same time, the operator presses down on pedal 143 to move the burners 134 and 135 up and down, so that they play above and below the sealed edges and maintain the plasticity of the glass until the seal is finished. The flaring edges 200 and 201 furnish extra glass to work with, so as to provide a seal of requisite thickness. After the operator has brought the two edges together, he moves the lever 117 slightly up and down, whereby the cup 75 (already united to the body of the cylinder) alternately pushes and pulls the plastic glass at the joint. In other words, the glass along the line of seal is kneaded or puddled to thicken the sealed joint. The final movement of cup 75 is downward to stretch the glass and straighten out the seal as much as possible. The result of this operation is a seal of substantially uniform thickness. The finished seal is indicated at 203 in Figs. 2 and 7. The heat of the flames from the sealing burners 134 and 135 is controlled by the pedal 178, as previously described. When the seal is finished, the operator releases the pedal 178 to lower the flames and give the seal a chance to harden. Consequently, the cup 75 remains in raised position when the cam track 107 is dropped. This explains why the lower end of shaft 59 in positions V and VI is slightly above the main portion of cam track 102, as shown in Figs. 1 and 2. In position VI, the seal 203 is subjected to the annealing action of the flame from burner 185. After the annealing operation, the bottle is moved to position I, where the completed filler is removed and new stock inserted.

I have found by actual tests that a double-walled glass filler produced in accordance with my invention gives a product in every way more satisfactory than the fillers produced by the old method where the bottom is formed on the outer cylinder by hand operation. Furthermore, my invention has the advantage of economy, because it saves labor and material, as more fully explained in the first part of this specification. For simplicity I have shown certain parts of the machine operated by hand, but it is evident that for commercial production of fillers on a large scale, all operations can be carried out automatically by properly timed connections from a cam shaft. In very large bottles where the glass is comparatively thick, the annular bead 198 on the outer cylinder may be dispensed with, since sufficient glass is available for the seal. However, in small bottles (like those of pint and quart size) where the glass walls are very thin, the bead 198 is needed to enable the production of a sealed joint sufficiently thick and strong.

Although I have described a certain method of procedure and a specific form of apparatus for carrying out my invention, I want it distinctly understood that I am not limited to any details described, unless such limitations are included in the claims which define the scope of my invention. It is evident that the fundamental principles of this invention, particularly as regards the apparatus for carrying out my novel method of sealing, may be embodied in other ways than herein set forth by way of illustration. When in the claims I speak of cutting the rounded bottom from an outer cylinder and sealing the severed bottom back in place after the insertion of the inner cylinder, I do not mean that the identical bottom cut from a certain cylinder must be sealed to the cylinder, for that is not necessary. As previously explained, the cylinders are blown in the same mold (or identical molds), and any bottom will fit any cylinder. It is in this broad sense that I speak of reuniting the severed bottoms to the cylinders.

I claim as my invention:

1. In the manufacture of doubled-walled vacuum bottles of glass, the process which comprises blowing an outer and an inner cylinder with a rounded bottom, cutting the rounded bottom off the outer cylinder to permit insertion of the inner cylinder, sealing the nested cylinders at the neck, and sealing the severed bottom on the outer cylinder while holding the parts in substantially vertical alignment and moving them toward and from each other to produce a kneading effect on the plastic glass at the sealed joint.

2. In the manufacture of double-walled vacuum bottles of glass, the process which comprises blowing an outer cylinder with a rounded bottom and with an annular bead above said bottom, cutting off said bottom approximately along the center of said bead to provide two flaring rims, one on the body of the cylinder and the other on the severed bottom, inserting an inner cylinder into the open outer cylinder, sealing the nested cylinders at the neck, and sealing said flaring rims while holding the severed parts in substantially vertical alignment and moving them toward and from each other to produce a kneading effect on the plastic glass at the sealed joint, said flaring rims providing extra glass to form a seal of requisite strength and substantially uniform thickness.

3. In a machine for completing the fillers of double-walled vacuum bottles of glass, means for rotatably supporting a bottle unit consisting of an inner cylinder sealed at the neck to an outer cylinder open at the bottom, means for rotatably supporting a cup of blown glass in axial alignment with said unit and spaced therefrom, said cup being adapted to form the rounded bottom of the outer cylinder, burners for heating the adjacent rims of said outer cylinder and said cup to make them plastic for sealing, means for bringing the plastic rims together to form a sealed joint, and means for producing a kneading effect on the plastic glass at the joint to form a seal of requisite strength and substantially uniform thickness.

4. In a machine for completing the fillers of double-walled vacuum bottles of glass, means for rotatably supporting a bottle unit in substantially vertical position, said unit consisting of an inner cylinder sealed at the neck to an outer cylinder open at the bottom, a horizontally rotatable member for supporting a cup of blown glass in substantially axial alignment below said unit, said cup being adapted to form the rounded bottom of the outer cylinder, burners for heating the adjacent rims of said outer cylinder and said cup to make them plastic for sealing, and means for raising said support to move the rim of the cup into sealing contact with the rim of the outer cylinder, whereby these parts are integrally united, said last-mentioned means permitting slight up and down movement of the cup while the sealed joint is still plastic to produce a kneading effect on the glass, whereby the finished seal is of requisite strength and substantially uniform thickness.

MINER P. WETMORE.